LIMITER CONTROL SYSTEM FOR STEREOPHONIC RADIO RECEIVER
Filed Nov. 1, 1960
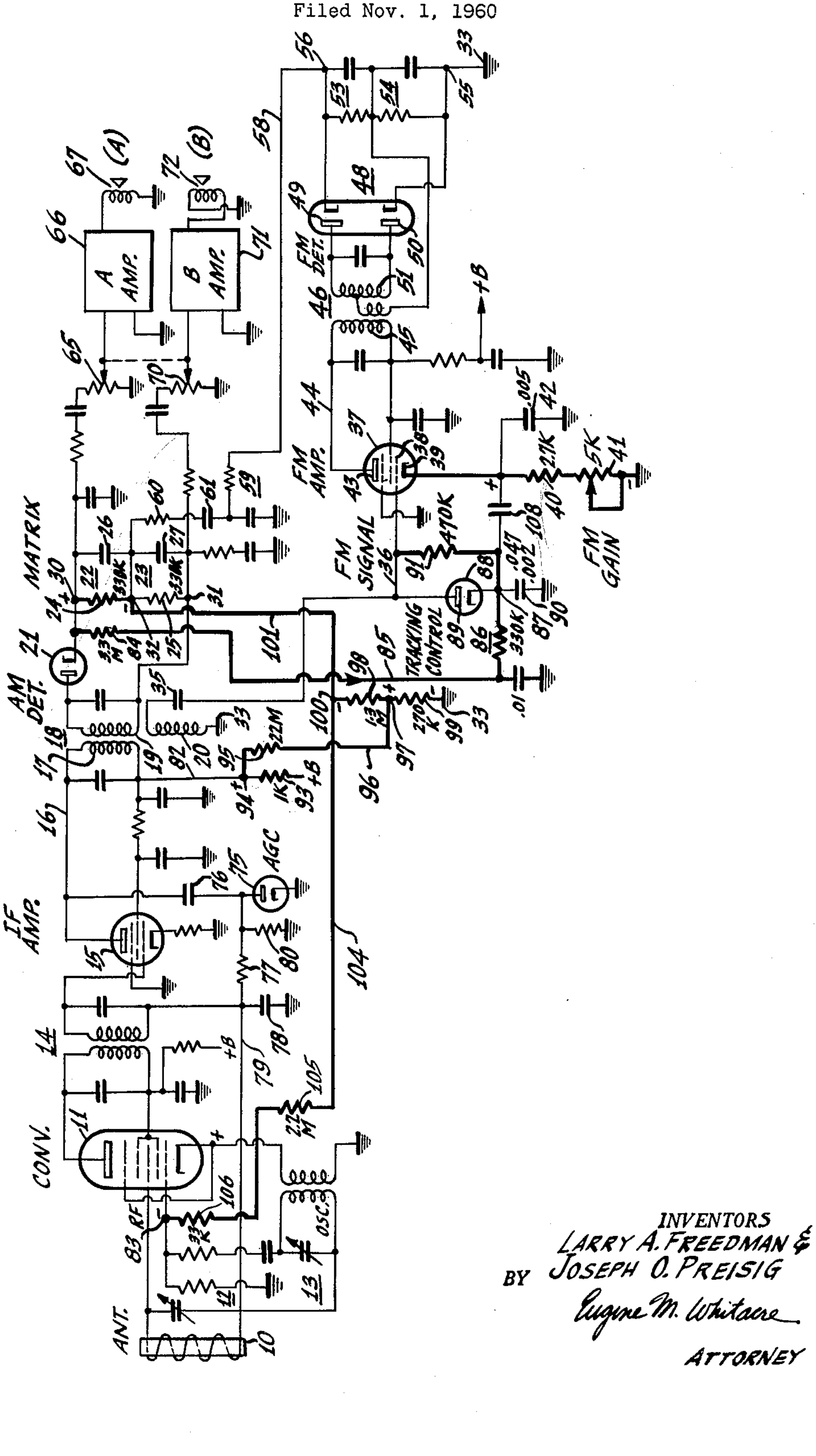
INVENTORS
LARRY A. FREEDMAN &
JOSEPH O. PREISIG
BY Eugene M. Whitacre
ATTORNEY United States Patent Office 3,128,345

Patented Apr. 7, 1964

3,128,345
LIMITER CONTROL SYSTEM FOR STEREOPHONIC RADIO RECEIVER

Larry A. Freedman, East Brunswick, and Joseph O. Preisig, Trenton, N.J., assignors to Radio Corporation of America, a corporation of Delaware Filed Nov. 1, 1960, Ser. No. 66,510
15 Claims. (Cl. 179—15)

This invention relates to stereophonic radio signal receiving systems of the type for selecting and translating carrier waves or signals which are amplitude modulated in accordance with one of a pair of stereophonically-related sound signals, and concurrently angle or frequency modulated in accordance with the other of said pair of stereophonically-related signals, and more particularly to signal amplitude limiter circuits therefor.

The stereophonically-related sound signals, designated as A and B signals, for modulating the carrier-wave or signal are normally matrixed to form an (A—B) signal which is used to angle or frequency modulate the carrier wave, and an (A+B) signal which is used to amplitude modulate the angle or frequency modulated carrier wave. A conventional monophonic (AM) radio receiver may then receive the modulated signal or carrier wave and detect the (A+B) sound signal as conventional amplitude modulation.

A stereophonic receiver for such modulated carrier waves includes detector circuits for demodulating or detecting both the amplitude-modulation component and the angle-modulation component thereof to derive the (A+B) and (A—B) signals, respectively. To obtain the individual A and B signals, the (A+B) and (A—B) signals are added and subtracted in a suitable matrixing circuit or network as is known. The resultant signals are then amplified in separate A and B, or left and right, stereophonic signal channels of the receiver and reproduced in stereophonic relation through individual spaced, left and right, loudspeaker means for the respective signal channels.

Automatic-gain-control (AGC) circuits in such broadcast receivers do not provide signal output amplitudes which are completely independent of the carrier wave signal strength variations. For this reason, the amplitude of the (A+B) signal from the amplitude-modulation detector may vary as the received carrier signal strength changes. Also the received signal strength or average amplitude at the amplitude-modulation detector may vary from one broadcast signal to another, or from station to station, and thus the amplitude or tracking relation of the derived (A+B) and (A—B) signals, may likewise vary. If the derived (A+B) and (A—B) signals are not maintained in a predetermined amplitude relationship, by reason of any of the above noted conditions of operation, the original amplitude relation or ratio of these signals as used to modulate the transmitter will be changed, and the resultant signals from the matrix network which are reproduced by the receiver sound signal channels will not provide the proper stereophonic effect.

In stereophonic receivers, a limiter is generally provided in the angle or frequency-modulation channel preceding the demodulator or detector means. A static limiter generally provides substantially constant signal output over a wide range of signal strength variations and therefore the desired stereophonic perspective above referred to would not be maintained.

It is therefore an object of this invention to provide a stereophonic signal receiver of the type described having means for maintaining tracking of the signal output, or a predetermined amplitude ratio between the detected (A+B) and (A—B) signals, from the separate angle-modulation and amplitude-modulation channels thereof, through improved control of limiter means in the angle-modulation channel in response to variations in the received signal strength.

It is also an object of this invention to provide an improved and composite control circuit for the amplitude tracking of the angle or frequency-modulation signal channel with the amplitude-modulation signal channel of a stereophonic signal receiver of the type described, wherein the angle or frequency-modulation channel includes a bias-controlled limiter-amplifier circuit and wherein the tracking control information, a composite variable tracking control voltage for the limiter amplifier circuit, is derived from a plurality of different sources responsive to different signal strength variation levels.

A receiver for a carrier wave signal modulated in both angle, or frequency, and amplitude with stereophonic information, is provided with separate amplitude and angle or frequency-modulation channels in which the angle or frequency-modulation channel includes a limiter-amplifier circuit followed by an angle-modulation or frequency-modulation detector circuit. Control of the amplitude of the output (A—B) signal of the angle-modulation detector circuit is provided by a tracking control circuit connected with the limiter amplifier circuit, and including a plurality of sources which develop a composite control, or tracking, voltage in response to variations in the signal strength of the received carrier wave, thereby to track with the output (A+B) signal of the amplitude-modulation channel in predetermined relation and prevent matrixing errors which might otherwise result.

It is, therefore, a further and important object of this invention to provide an improved tracking control circuit for stereophonic signal receivers of the AM—FM type which operates more effectively to maintain a substantially constant amplitude relation in the signal output from the amplitude-modulation and the angle or frequency-modulation channels than has heretofore been possible.

In one embodiment of the invention, the signal-amplitude tracking control circuit is provided in connection with a limiter-amplifier in the angle or frequency modulation channel, and the composite variable tracking control voltage therefor is derived in connection with the amplitude-modulation detector circuit, the oscillator grid of the input signal converter, the anode circuit of the intermediate-frequency (IF) amplifier which is under (AGC) automatic gain control, and the cathode or common electrode circuit of the limiter amplifier per se.

In order to obtain a signal output from the angle-modulation channel which is proportional to the mean level of the IF signal applied to the amplitude-modulation detector, and hence the detected (A+B) signal therefrom for proper amplitude tracking relation therewith in this embodiment, the variable tracking-control voltage comprises substantially-fixed and adjustable negative-potential portions which are added, in the control circuit connected between the limiter tube cathode and input grid, to positive-going potential portions which increase with signal strength (of the IF signal) to different degrees at different signal levels.

The next result is to provide accurate tracking of the angle, or frequency modulation (A—B) signal to the amplitude-modulation (A+B) signal throughout relatively wide variations in signal strength of the received signals. The invention will, however, be further understood from the following description when considered in connection with the accompanying drawing.

In the drawing, the sole figure is a schematic circuit diagram of a stereophonic signal receiver of the FM–AM type having amplitude and angle-modulation channels and embodying the invention. Referring to the drawing, the stereophonic two-channel receiver shown includes signal pickup means represented by a loop antenna 10 which is coupled to converter means including a converter tube 11 which, with its associated RF and oscillator circuits 12 and 13 respectively, develops an IF signal which is applied through an IF coupling transformer 14 to an IF amplifier including an amplifier tube 15 having an output circuit 16. The output circuit is connected with the tuned primary winding 17 of an IF output coupling transformer 18 which has a secondary winding 19 and a tertiary winding 20, both tuned to the IF.

The IF output coupling transformer 18 provides for dividing the amplitude-modulation and the angle, or frequency, modulation channels in the receiver. In the present example, the secondary winding 19 is connected to the amplitude-modulation channel including the envelope detector. The amplitude-modulation envelope detector circuit includes the diode 21 connected in series with first and second envelope detector load circuits 22 and 23 across the secondary winding 19. The load circuits are in the form of resistor-capacitor networks comprising series-connected load resistors 24 and 25 and respective shunt capacitors 26 and 27. The load circuit 22 provides the (A+B) modulation component signal at an output terminal 30 with respect to common ground for the system, while the −(A+B) modulation component of an applied signal is provided at an output terminal 31 for the load circuit 23, with respect to said ground. The two load circuits 22 and 23 are effectively serially connected between the terminals 30 and 31 and provided with a common terminal 32 at the junction of the load circuits.

The tertiary winding 20 is connected with the angle, or frequency modulation channel to supply the IF signal thereto. One end of this winding is connected to chassis or common ground for system which is designated by the reference numeral 33 here and throughout the circuit shown. The opposite end of the winding 20 is coupled through an input coupling capacitor 35 to the input circuit 36 of the limiter amplifier stage which includes an amplifier device 37. This may be of the electron-tube type, such as the pentode tube shown, having an input or control grid 38 connected with the input circuit 36 and a cathode 39 connected to common or chassis ground 33 through cathode resistor means. In the present example the resistor means comprises a fixed resistor section 40 and a variable resistor section 41 in series therewith, and for which the by-pass capacitor 42 is provided.

The anode 43 is connected through an output circuit 44 to the tuned primary winding 45 of a discriminator transformer 46 which drives a known angle, or frequency modulation detector 48. The detector 48 includes a pair of diodes 49 and 50 with their anodes connected with opposite ends of the tuned secondary winding 51 of the discriminator transformer 46. The load circuit for the diodes 49 and 50 comprises a pair of resistor-capacitor networks 53 and 54 connected in series between the cathodes thereof. One terminal 55 of the load circuit is connected to chassis or common ground 33 for the system, and the other end terminal 56 of the load circuit is connected through an output circuit lead 58 and a de-emphasis network 59 with the junction of the envelope detector load circuits 22 and 23 effectively at the terminal 32. A series isolating resistor 60 and coupling capacitor 61 are connected between the de-emphasis network 59 and the terminal 32 as shown.

The angle, or frequency modulation (A−B) signal at the output terminal 56 is applied through the above connection to the amplitude-detector output circuit at the terminal 32 where it is added and subtracted, in an effective matrix, to provide the A signal component at the output terminal 30 and the −B signal component at the output terminal 31. Thus the (A−B) signal is derived, or detected, from the angle modulation of the carrier wave, and the (A+B) signal is derived, or detected, from the amplitude modulation of the carrier wave. The matrixing of these two detected signals is accomplished by the interconnection of the angle and amplitude modulation detectors.

From the terminal 30 the channel A signals are translated through a separate output circuit which includes variable gain or volume control means 65 connected to a suitable channel amplifier 66 which, in turn, is coupled to sound-reproducing or loudspeaker means 67 for the channel. Likewise the terminal 31 for the channel B signals is coupled to a second gain or volume control means 70 having connection with a suitable channel amplifier 71 which, in turn, is coupled to the channel sound reproducing or loudspeaker means 72. The correct loudspeaker phasing is obtained, preferably by reversing the polarity of the signal output connection at a suitable point in one channel, as indicated for channel B at the loudspeaker means 72.

It will be noted that the receiving system includes AGC means comprising a diode rectifier 75 coupled through a capacitor 76 to the IF output circuit 16 and connected through a filter resistor 77, provided with a shunt filter capacitor 78, to the AGC circuit lead 79 for the converter 11 and the IF amplifier 15. The load resistor 80 for the AGC diode 75 is connected between the anode and chassis or common ground as indicated, to provide increased negative bias on the converter and IF amplifier tubes with increased IF signal strength at the IF circuit 16, corresponding to increased signal strength in the received signal.

Since the (A+B) signal output level from the amplitude-modulation detector 21 varies with signal strength as referred to hereinbefore, although controlled by AGC action, corresponding variation in the (A−B) signal output of the angle-modulation signal channel is provided for maintaining tracking in the relative amplitudes of the two channel output signals, and proper matrixing for balanced stereophonic signal reproduction at the loudspeakers 67 and 72. In the present example, tracking control is provided by varying the signal translation through the limiter amplifier in accordance with variations in the received signal strength as translated into different control voltages derived from different portions of the signal receiving system.

In accordance with the invention, the control voltage applied to the limiter amplifier means in the angle or frequency modulation channel is a variable composite (negative) voltage derived from three voltage sources in an extended control circuit which provides two signal-variable positive control-voltage components which are effective at different signal amplitude levels, and one negative voltage component.

One signal-variable positive control voltage component is obtained at the amplitude-modulation detector output resistor 24. The terminal 30 connected with the output resistor 24 is a positive potential point and this is connected through a decoupling resistor 84, a connection lead 85 and a filter network 86, with the cathode terminal 87 of a clamping diode 88, the anode 89 of which is connected with the grid circuit 36 and the grid 38. The cathode terminal 87 is coupled to ground or chassis through a capacitor 90 which is part of the filter 86. A resistor 91 connected between the anode and cathode electrodes of the diode 88 serves to complete the D.C. current path for the diode.

The second of the two signal-variable positive control-voltage components for the limiter amplifier 37 is provided by the anode and screen supply circuit 82 of the IF amplifier tube 15. Between the +B supply connection for the tube 15 and the circuit 82 is a series voltage-dropping resistor 93, the output terminal 94 of which is connected with the circuit 82 and with the anode and screen elements of the tube 15 as indicated. From the terminal 94 a connection is made with the clamping diode 88 cathode through a series voltage-dropping resistor 95 and a circuit lead 96. The latter is connected with an intermediate terminal 97 between two series resistors 98 and 99 connected between a terminal 100 for the resistor 98 and ground or chassis 33. The terminal 100 is also connected through a lead 101 with the terminal 32, which is at the negative end of the AM-detector output resistor 24.

The clamping-level control circuit for the clamping diode 88 can be traced from the cathode thereof, or terminal 87, through the filter 86 and lead 85, thence through the de-coupling resistor 84 to the terminal 30 which is the first positive-going terminal. From the terminal 30 the circuit is traced through the load resistor 24 and the terminal 32 to the connection lead 101 and its junction with the terminal 100. From the terminal 100 the circuit is then traced through the series resistors 98 and 99 and ground. In this circuit the terminal 97 is the second positive-going terminal, to be referred to later.

An additional and main negative (the third) bias is also provided in connection with the terminal 100 and this main bias may be derived from any suitable fixed source such as the oscillator grid circuit 83 of the converter 11. This connection is made through a circuit lead 104 connected between terminal 100 and the grid circuit 83, and includes two series resistors 105 and 106 for effectively de-coupling the signals on the grid circuit from the bias or control circuit at the terminal 100, while permitting the application thereto of a portion of the negative potential available at the oscillator grid circuit, The grid-bias circuit at the diode cathode terminal 87 is bypassed for audio frequencies to the cathode 39 through a capacitor 108.

A diode clamped limiter circuit is shown and described in a copending application of Francis R. Holt entitled "Limiter," Serial No. 55,881, filed September 14, 1960, and assigned to the assignee of this application. Briefly, the tube 37 is connected as a static or constant-gain limiter. The diode 88 is connected in the grid circuit of the limiter amplifier tube 37 to clamp the positive peaks of an applied signal at a level determined by the control voltage applied to the diode cathode terminal 87. The limiter then operates between cut-off and the clamping level of the diode 88. As the diode cathode voltage becomes more positive with increasing signal levels, then the positive signal peaks are clamped to a more positive voltage, thereby increasing the difference between the clamping and cut-off voltages. This permits a larger amplitude signal to be developed in the limiter output circuit, to maintain the desired tracking relation between the A—B and A+B signals.

In the circuit described herein, starting with zero signal condition, the angle or frequency modulation amplifier 37 is maintained at or near anode-current cutoff by an initial negative bias voltage on its grid. This negative voltage is the sum of the positive voltage from the plate-screen supply of the IF amplifier 15 and the negative voltage derived from the oscillator grid circuit 83 of the converter 11. This sum voltage, appearing at the terminal 100, is applied to the grid 38 through the circuit including the diode detector output resistor 24, the decoupling resistor 84, the filter network 86 and the load resistor 91 for the clamping diode.

As a received signal at the IF circuit 16 increases in amplitude, the voltage developed by the AM detector 21 causes the D.C. voltage at the cathode and the terminal 30 to become more positive. This causes the cathode of the diode 88 to become more positive, thereby decreasing the negative bias on the tube 37, and thus allowing for an increasing signal output from the amplifier 37, as is desirable for maintaining the proper tracking relation between the two detector output signals to be matrixed as hereinbefore described.

Because of the gradual slope in the grid-voltage plate-current characteristic of the amplifier tube 37 in the vicinity of cut-off, at which it is initially operated as above described, the positive bias or control voltage developed by the amplitude-modulation detector at the output resistor 24 may be too small to provide proper tracking. Therefore this bias or control voltage or potential, from one source, is supplemented by another positive-going bias or control potential derived from the IF amplifier 15 as a second source. The increase in received signal strength activates the automatic-gain-control circuit and reduces the anode and screen current of the amplifier tube 15. This reduced anode and screen current causes an increase in positive voltage at the terminal 94 and this voltage is applied through the resistor 95 to the terminal 97, and thence to the grid of the amplifier 37 and the clamping diode to further increase the gain through the channel and the signals applied to the FM detector and the matrixing circuit.

For moderate and strong signals, the current in the IF amplifier is relatively small and this effect is less. The tracking control continues to very strong signal strengths where the combination of the IF signal and D.C. bias voltage applied to the grid circuit 36 of the amplifier tube 37 causes grid current to flow. The linearity and gain of the amplifier 37 is controlled to some extent by the size of the cathode resistance which is determined by the setting of the variable resistor portion 41. Proper proportioning of the cathode resistance together with the tracking signal, provides both accurate tracking and proper angle or frequency-modulation channel gain.

There is sufficient gain in the FM channel, when the cathode resistor 41 is at its lowest value (minimum negative bias) to exceed the gain through the AM channel. Conversely, when the cathode resistor 41 is adjusted for its highest value, there is sufficient reduction in gain in the FM channel so that the AM channel provides the greater gain. Therefore, by adjusting the cathode resistor 41, in the angle or frequency-modulation channel, the gain of the two channels for the recovered signals (A+B) and (A—B) that are to be matrixed may be balanced, whereby the output signal amplitude may be made substantially the same. Then as the signal strength of the incoming signal varies, the other portions of the control circuit maintain the balance and the tracking of the two channels.

The FM channel uses an FM detector which gives increased signal amplitude output in response to increased signal strength as well as to increased FM modulation. That is, the output signal is proportional to the product of the amplitude and the angle modulation of the signal applied thereto. If this detector were preceded with a static limiter, the variations in amplitude would be eliminated. The composite variable tracking-control voltage applied to the channel amplifier provides full control over a wide range of signal strength variations.

For the weaker signals, change in the limiter-amplifier control voltage or bias is determined by a combination of the anode and screen current drawn by the IF amplifier tube 15 in response to AGC action, and the voltage across the AM detector output resistor 24. This AGC action causes a drop in voltage across the series supply resistor 93 and accordingly the control voltage or potential at the terminal 100 in the control circuit becomes more positive as the signal strength increases. For the stronger signals, the change in current at the IF amplifier 15 due to AGC action is relatively less than before, and the AM detector then provides an increasingly positive potential at the terminal 30 in the control circuit with increased signal strength, thus taking over the action from the IF amplifier. The initial fixed amount of negative biasing potential may be derived from any suitable source such as the grid circuit of the local oscillator as in the present example. This voltage is used to oppose the positive potentials derived from the above positive sources to provide the desired variable clamping level and bias or control potential for the diode 88 and the FM amplifier tube 37. In effect, the system works with a reversed-action AGC which is supplied to the diode and to the tube 37. In other words, the stronger the signal, the more gain the FM limiter-amplifier has and this control is provided over a relatively wide range of signal strength variations.

The stereophonic radio signal receiving system of the present invention provides amplitude tracking of the FM signal with the AM signal for more effective matrixing in response to a wide range of signal strength variations. An improved limiter-amplifier control circuit in the frequency-modulation channel is responsive to a composite variable tracking control voltage. The variable tracking control voltage comprises positive-going potential portions which increase with signal strength at the intermediate-frequency amplifier to different degrees at different signal levels. The net result is to provide accurate tracking of the angle, or frequency, modulation (A—B) signal to the amplitude-modulation (A+B) signal throughout wide variations of signal strength of the received signal. This improved circuit and control action, furthermore, is provided with low-cost components.

Having described the invention, what is claimed is:

1. In a stereophonic radio receiver for amplitude and angle-modulated carrier signals, the combination with an intermediate-frequency signal amplifier having automatic gain control means, of means providing an amplitude-modulation signal channel coupled to said amplifier and an amplitude-modulation detector therefor having an output circuit providing a positive-going direct-current control voltage component which increases within the average amplitude of an applied signal, means providing an angle-modulation signal channel coupled to said amplifier and including angle-modulation detector means, a signal limiter amplifier coupled to said angle-modulation detector means for controlling the signal amplitude applied thereto and the tracking relation of the signal output from said signal channels, and a tracking control circuit for said limiter amplifier operative under control of said intermediate-frequency amplifier and the automatic gain control action therefor and in response to the control voltage component derived from the amplitude-modulation detector output circuit to provide effective control of said tracking relation.

2. In a stereophonic radio receiver for concurrently amplitude and angle-modulated carrier signals, the combination with an intermediate-frequency signal amplifier having automatic-gain-control means and amplitude-modulation and angle-modulation signal channels coupled to said amplifier, of an amplitude-modulation signal detector in the amplitude-modulation signal channel having an output circuit providing a first positive-going signal-responsive control-voltage component, means connected with said intermediate-frequency amplifier providing a second positive-going signal-responsive control-voltage component, a signal amplifier coupled to said angle-modulation detector means in the angle-modulation signal channel, a clamping diode connected with said last-mentioned amplifier and poled for controlling the positive signal peaks applied thereto, and a tracking control circuit connected for applying to said diode and said amplifier a variable composite control voltage including said positive-going components in effectively supplemental control relation one with respect to the other.

3. In a stereophonic radio receiver for concurrently amplitude and angle-modulated carrier signals, the combination as defined in claim 2, wherein said control circuit further provides means whereby for moderate and strong signals the first control-voltage component is increasingly effective and whereby for reduced and weaker signals the second control-voltage component is increasingly effective, thereby to provide substantially uniform, channel amplitude tracking control over a relatively wide range of signal-strength variations.

4. In a stereophonic radio receiver for angle and amplitude modulated carrier signals, the combination with an amplitude-modulation signal channel and an envelope detector therefor having an output circuit providing a positive-going direct-current control voltage component in response to increases in the average amplitude of an applied signal, an angle-modulation signal channel including angle-modulation detector means and a variable-gain signal amplifier coupled thereto, said amplifier having a signal input circuit and a clamping diode connected in shunt relation thereto, said diode having a cathode and an anode and having the anode connected to the high potential side of said input circuit, and a tracking control circuit connected for applying a variable composite control voltage to the cathode of said diode and including the voltage component from the amplitude-modulation detector output circuit, means providing a source of negative biasing potential in said control circuit connected in opposition to said positive-going voltage component, and means connected with said control circuit for deriving a second positive-going control voltage component therefor responsive to increases in the average amplitude of an applied signal, the tracking control circuit being connected and operative to effect tracking control of said receiver with applied signals of relatively low average amplitude under control of said last-named means and being further connected and operative to provide effective tracking control for moderate and strong signals preponderantly in response to the control-voltage component derived from the amplitude-modulation detector output circuit.

5. In a radio receiving system for carrier signals modulated in both angle and amplitude, the combination with means providing amplitude and angle-modulation signal-translating channels and detector means in each of said channels, of limiter-amplifier means in the angle-modulation channel responsive to variations in an applied control voltage for maintaining tracking of the signal output from the angle-modulation and amplitude-modulation channels, and means connected for deriving a composite variable tracking-control voltage for said limiter-amplifier means and including a fixed negative source and a plurality of different positive-going sources in said receiver responsive to different signal strength variation levels.

6. A limiter-amplifier control circuit for a stereophonic radio signal receiver having amplitude and angle-modulation signal translating channels and an automatic-gain-controlled intermediate-frequency amplifier connected to apply signals thereto, comprising, in combination, an operating voltage supply circuit for said amplifier connected to provide a variable positive control voltage in response to automatic-gain-control action, an amplitude-modulation diode detector in the amplitude-modulation signal channel having an output circuit connected for deriving a second variable positive control voltage in response to variations in the average amplitude of applied signals, a limiter amplifier circuit in the angle-modulation channel including an amplifying device, an input circuit for said device coupled to said intermediate-frequency amplifier, a clamping diode connected in shunt relation to said input circuit and with said control voltage source for receiving a composite control voltage therefrom, and means providing a source of negative biasing potential in said control circuit connected in opposition to the positive voltages from said sources.

7. A limiter amplifier control circuit as defined in claim 6, wherein the intermediate-frequency amplifier is coupled to a signal converter having an oscillator portion providing said source of negative biasing potential for said control circuit, and wherein the amplifying device in the angle-modulation channel is an electronic-tube having a control grid connected with said input circuit and a cathode having a variable cathode resistor connected to common ground for the control circuit providing a channel-balancing source of negative biasing potential supplemental to and aiding said first named source of negative biasing potential in said circuit.

8. A limiter-amplifier control circuit for a stereophonic ratio signal receiver having amplitude and angle-modulation signal translating channels and an intermediate-frequency amplifier connected to apply signals thereto, automatic-gain-control means for said amplifier, an operating potential supply circuit for said amplifier connected to provide a positive-going control potential in response to increased signal strength at said amplifier with automatic gain control action, a diode detector in the amplitude-modulation signal channel having an output circuit connected for deriving a second positive-going control potential in response to an increase in the average amplitude of applied signals, an angle-modulation signal detector and means providing a limiter amplifier circuit therefor in the angle-modulation channel, said limiter-amplifier circuit including an amplifier tube having a control grid and a cathode, means providing a signal input circuit for said grid connected for applying signals thereto from said intermediate-frequency amplifier, a diode having an anode connected with said control grid and having a cathode connected with said positive-going potential sources for receiving a composite control voltage therefrom, and a variable cathode resistor for said amplifier tube connected between the cathode thereof and ground for said system.

9. A limiter-amplifier control circuit as defined in claim 8 wherein the intermediate-frequency amplifier is coupled to a signal converter having an oscillator portion providing a source of fixed negative biasing potential in said control circuit, and wherein means are provided for applying said negative biasing potential to the cathode of said diode and said control grid in opposition to the positive-going potentials as part of said composite control voltage.

10. In a stereophonic radio signal receiver for translating carrier-wave signals amplitude modulated in accordance with one of a pair of stereophonically-related signals and concurrently angle modulated in accordance with the other of said stereophonically-related signals, means providing an amplitude-modulation signal channel including a diode signal detector having an output load resistor, means providing an angle-modulation signal channel including angle-modulation detector means and a signal amplifier coupled thereto for controlling the applied signal amplitude, said amplifier being of the electron-tube type having a control grid and a signal input grid circuit connected therewith, a diode having a cathode and an anode and having the anode connected to said control grid, and a tracking control circuit for applying a variable composite control voltage to the cathode of said diode and to the control grid to set the positive peaks of an applied signal at the amplifier grid circuit and thereby control the output level of the signal applied to the angle-modulation detector means said control circuit including two control voltage sources positive-going in response to increases in signal strength and one of which is the amplitude-modulation detector load resistor.

11. In a stereophonic radio receiver the combination with means providing amplitude and angle-modulation signal-translating channels, of a diode detector in the amplitude-modulation channel having a signal output resistor providing a variable direct-current signal voltage between positive and negative terminals in response to applied modulated signals, an automatic-gain-controlled intermediate-frequency amplifier coupled to said detector for applying said signals thereto, means providing a positive operating-current supply circuit for said amplifier having a positive output terminal the voltage of which varies in response to automatic-gain-control action, limiter amplifier means in the angle-modulation signal-translating channel including an amplifying device having an input circuit coupled to said intermediate-frequency amplifier with a clamping diode connected in shunt relation thereto, a tracking control circuit connected to said diode and amplifying device to control the clamping level and the signal output through said channel, said control circuit including the output resistor of said diode detector serially therein and poled to apply an increasing positive control potential to said diode and the amplifying device in response to increase in the average amplitude of the applied signal, and means providing a direct-current connection for said control circuit between the negative terminal of said diode output resistor and the positive output terminal of said operating-current supply circuit for applying a second signal-variable positive control potential to said diode and amplifying device through said control circuit.

12. In a stereophonic radio receiver, the combination as defined in claim 11, wherein the amplifying device is an electronic tube having a control grid connected with said input circuit and with the diode anode connected to said control grid, and wherein the amplifying tube is provided with a variable cathode resistor connected in said tracking control circuit for initial negative biasing of said amplifying device and channel balance.

13. In a radio receiver for carrier signals modulated in both angle and amplitude, the combination of, means provided amplitude and angle-modulation signal-translating channels, amplitude-modulation detector means in the amplitude-modulation signal channel having signal output terminals providing a direct-current output voltage variable in response to signal strength variations, an intermediate-frequency amplifier coupled to said detector means for applying said modulated signals thereto and including an electronic amplifier tube having an anode current supply circuit with a series voltage-dropping resistor therein having a positive output terminal, a voltage divider resistor network connected between said terminal and common circuit ground for said receiver and having an intermediate positive potential supply terminal, a limiter amplifier in the angle-modulation signal-translating channel including an amplifying device having an input circuit coupled to the intermediate frequency amplifier and having a signal amplitude-clamping diode connected in shunt relation thereto, a tracking control circuit for said diode and amplifying device connected with the output terminals of said amplitude-modulation detector means to apply said variable output voltage to said diode and the amplifying device as part of a composite tracking-control potential, and means providing a direct-current connection for said control circuit between the negative terminal of said detector output circuit and the positive output terminal of said voltage-dropping resistor for applying a second part of said composite tracking potential to said diode and amplifying device through said control circuit.

14. In a stereophonic radio receiver for concurrently amplitude and angle-modulated carrier signals, the combination with an intermediate-frequency signal amplifier and signal-responsive automatic-gain-control means therefor, of means providing an amplitude-modulation signal channel coupled to said amplifier and including a diode amplitude-modulation detector having an output load resistor, means providing an angle-modulation signal channel coupled to said amplifier and including angle-modulation detector means, a limiter amplifier coupled to said angle-modulation detector means for controlling the signal amplitude applied thereto, said limiter amplifier being of the electron-tube type having a control grid and a cathode, a diode having a cathode and an anode and having the anode connected to said control grid, and a tracking control circuit connected for applying a variable composite control voltage to the cathode of said diode and to the control grid to track the output levels of the signals from the angle-modulation detector means and the amplitude-modulation detector, said control circuit having said amplitude-modulation detector output load resistor connected with said diode cathode and amplifier control grid to provide said composite control voltage in part, means connected in circuit with said intermediate-frequency amplifier for deriving therefrom a variable direct-current voltage responsive to automatic-gain-control action on said amplifier, and circuit means connected between said last named means and said control circuit for applying said voltage thereto as part of said composite control voltage.

15. In a radio receiver for carrier signals amplitude modulated in accordance with one of a pair of stereophonically-related signals and concurrently angle modulated in accordance with the other of said stereophonically-related signals, a tracking control system comprising in combination, an intermediate-frequency amplifier, signal-responsive automatic-gain-control means therefor, means providing an amplitude-modulation signal channel coupled to said amplifier and including a diode amplitude-modulation detector having an output load resistor, means providing an angle-modulation signal channel coupled to said amplifier and including angle-modulation detector means having signal input and output circuits, a limiter amplifier coupled to said input circuit for controlling the applied signal amplitude, said limiter amplifier being of the electron-tube type having a control grid and a cathode, a variable cathode resistor connected with said cathode, a diode having a cathode and an anode and having the anode connected to said control grid, and a control circuit connected for applying a variable composite control voltage to the cathode of said diode and to the control grid to track the output levels of the signals from the angle-modulation detector means and the amplitude-modulation detector, said control circuit including said amplitude-modulation detector output load resistor and said variable cathode resistor serially connected with said diode cathode and amplifier control grid in polarity opposition to provide said composite control voltage in part, means connected in circuit with said intermediate-frequency amplifier for deriving therefrom a variable direct-current voltage responsive to automatic-gain-control action on said amplifier, and circuit means connected between said last named means and said control circuit for applying said voltage thereto as part of said composite control voltage, said amplitude-modulation diode detector and said intermediate-frequency amplifier thereby providing said composite tracking control voltage jointly over a relatively wide signal amplitude variation range for effective tracking of the channel output signal and improved stereophonic sound reproduction from said receiver.

References Cited in the file of this patent

UNITED STATES PATENTS

| | | |
|---|---|---|
| 2,286,442 | Schock | June 16, 1942 |
| 2,512,530 | O'Brien et al. | June 20, 1950 |
| 2,654,885 | Wilmotte | Oct. 6, 1953 |
| 2,698,379 | Boelens et al. | Dec. 28, 1954 |
| 2,851,532 | Crosby | Sept. 9, 1958 |